United States Patent
Barkaee

(10) Patent No.: US 12,461,740 B2
(45) Date of Patent: Nov. 4, 2025

(54) SYSTEMS AND METHOD FOR ANALYZING SOFTWARE AND TESTING INTEGRATION

(71) Applicant: Nadav Barkaee, Newton, MA (US)

(72) Inventor: Nadav Barkaee, Newton, MA (US)

(73) Assignee: Applause App Quality, Inc., Framingham, MA (US)

( * ) Notice: Subject to any disclaimer, the term of this patent is extended or adjusted under 35 U.S.C. 154(b) by 0 days.

(21) Appl. No.: 17/237,540

(22) Filed: Apr. 22, 2021

(65) Prior Publication Data

US 2022/0342663 A1    Oct. 27, 2022

(51) Int. Cl.
G06F 11/36    (2025.01)
G06F 8/71    (2018.01)
G06F 8/77    (2018.01)
G06F 11/30    (2006.01)
G06F 11/34    (2006.01)
H04L 12/26    (2006.01)

(52) U.S. Cl.
CPC . G06F 8/71 (2013.01); G06F 8/77 (2013.01)

(58) Field of Classification Search
CPC ............. G06F 11/3668; G06F 11/3672; G06F 11/3428; G06F 11/132; G06F 11/323; G06F 11/34; G06F 11/3447; G06F 11/3452
See application file for complete search history.

(56) References Cited

U.S. PATENT DOCUMENTS

| | | |
|---|---|---|
| 8,230,267 B2 | 7/2012 | Noller et al. |
| 9,053,242 B2 | 6/2015 | Smith et al. |
| 9,069,904 B1 | 6/2015 | Cohen et al. |
| 9,218,266 B2 | 12/2015 | Dhanapal et al. |
| 9,563,544 B2 | 2/2017 | Mecke et al. |
| 9,697,110 B1 | 7/2017 | Arkadyev |

(Continued)

FOREIGN PATENT DOCUMENTS

| | | |
|---|---|---|
| CN | 107193734 A | 9/2017 |
| CN | 109960642 A | 7/2019 |

(Continued)

OTHER PUBLICATIONS

Altaf et al., Survey on Selenium Tool In Software Testing. IEEE. 2015. 6 Pages.

(Continued)

*Primary Examiner* — S. Sough
*Assistant Examiner* — Mohammad H Kabir
(74) *Attorney, Agent, or Firm* — Wolf, Greenfield & Sacks, P.C.

(57) ABSTRACT

An assessment system can generate a software quality value based on testing results and analysis of a multitude of factors that impact a readiness evaluation. For example, the system generates a software quality score (e.g., an Applause Quality Score "AQS") that enables development teams to understand the level of quality they are achieving for a given release and build-over-build. In various examples, the system generates a data-driven score to enable development teams or quality assurance teams to make decisions for when a build is ready for release. In further embodiments, the system can integrate user interfaces that present a software quality score in a user dashboard that is linked to version control systems. On review and acceptance of the score, a user can trigger the release of their new code or product.

24 Claims, 14 Drawing Sheets

(56) References Cited

U.S. PATENT DOCUMENTS

| | | | |
|---|---|---|---|
| 9,916,231 B2 | 3/2018 | Lundstrom | |
| 9,928,151 B1 | 3/2018 | Rodriguez Valadez et al. | |
| 10,149,189 B2 | 12/2018 | Ross | |
| 10,157,122 B1 | 12/2018 | Gohil et al. | |
| 10,169,189 B2 | 1/2019 | Ekambaram et al. | |
| 10,248,546 B2 | 4/2019 | Ekambaram et al. | |
| 10,305,758 B1* | 5/2019 | Bhide | G06F 16/2477 |
| 10,445,221 B2 | 10/2019 | Bromann et al. | |
| 10,579,507 B1 | 3/2020 | Lounibos et al. | |
| 10,642,721 B2 | 5/2020 | Kulkarni et al. | |
| 10,776,252 B1 | 9/2020 | Weiss | |
| 10,846,208 B1 | 11/2020 | Lakshmi et al. | |
| 10,853,232 B2 | 12/2020 | Henry et al. | |
| 10,860,461 B2 | 12/2020 | Mevorach et al. | |
| 11,023,363 B2 | 6/2021 | Lloyd et al. | |
| 11,042,472 B2 | 6/2021 | Vidal et al. | |
| 11,086,765 B2 | 8/2021 | Mukherjee | |
| 11,119,907 B1 | 9/2021 | Gopal | |
| 11,243,866 B1 | 2/2022 | Ramamoorthy et al. | |
| 11,288,177 B2 | 3/2022 | Balakrishnan et al. | |
| 11,327,875 B2 | 5/2022 | Poulin | |
| 11,416,377 B2 | 8/2022 | Bromann et al. | |
| 11,469,887 B1 | 10/2022 | Rubira Branco et al. | |
| 11,797,936 B1 | 10/2023 | Betgar et al. | |
| 11,874,931 B2 | 1/2024 | Bishop, III et al. | |
| 11,886,320 B2 | 1/2024 | Zhu et al. | |
| 12,093,166 B2 | 9/2024 | Zaleski et al. | |
| 2014/0132571 A1 | 5/2014 | Zeng et al. | |
| 2015/0074648 A1* | 3/2015 | Tal | G06F 11/3688 717/124 |
| 2015/0095890 A1* | 4/2015 | Stclair | G06F 8/10 717/124 |
| 2016/0026560 A1 | 1/2016 | Jackson et al. | |
| 2016/0044520 A1 | 2/2016 | Iyer et al. | |
| 2016/0378618 A1* | 12/2016 | Cmielowski | G06F 11/3612 714/38.1 |
| 2017/0220451 A1 | 8/2017 | Mankovskii | |
| 2017/0262130 A1 | 9/2017 | Lloyd et al. | |
| 2017/0302559 A1 | 10/2017 | Chu et al. | |
| 2017/0329699 A1* | 11/2017 | Adinarayan | G06F 11/368 |
| 2017/0337116 A1 | 11/2017 | Negara et al. | |
| 2018/0011780 A1 | 1/2018 | Aggarwal et al. | |
| 2018/0084047 A1 | 3/2018 | Hao et al. | |
| 2018/0189170 A1 | 7/2018 | Dwarakanath et al. | |
| 2018/0196731 A1 | 7/2018 | Moorthi et al. | |
| 2018/0365133 A1 | 12/2018 | Mitchell et al. | |
| 2019/0294528 A1* | 9/2019 | Avisror | G06F 11/3688 |
| 2019/0340512 A1 | 11/2019 | Vidal et al. | |
| 2020/0004665 A1 | 1/2020 | Shinge et al. | |
| 2020/0133829 A1 | 4/2020 | Zazo et al. | |
| 2020/0174917 A1 | 6/2020 | Patel et al. | |
| 2020/0379889 A1 | 12/2020 | Hamid | |
| 2021/0081308 A1 | 3/2021 | Golubev | |
| 2021/0089436 A1 | 3/2021 | Gangina | |
| 2021/0176155 A1 | 6/2021 | Awad et al. | |
| 2021/0374033 A1* | 12/2021 | Yang | G06F 11/3692 |
| 2022/0100632 A1* | 3/2022 | Kulkarni | G06F 11/3466 |
| 2022/0138081 A1 | 5/2022 | Varma et al. | |
| 2022/0269586 A1 | 8/2022 | Zaleski et al. | |
| 2023/0011004 A1 | 1/2023 | Fellows et al. | |
| 2023/0025441 A1 | 1/2023 | Oguara et al. | |
| 2023/0032088 A1 | 2/2023 | Goswami et al. | |
| 2023/0318929 A1 | 10/2023 | Soosahabi et al. | |
| 2024/0054225 A1 | 2/2024 | Hu et al. | |
| 2024/0411670 A1 | 12/2024 | Zaleski et al. | |

FOREIGN PATENT DOCUMENTS

| | | |
|---|---|---|
| CN | 112214404 A | 1/2021 |
| CN | 114416551 A | 4/2022 |
| CN | 115577365 A | 1/2023 |
| WO | WO 2024/126442 A1 | 6/2024 |

OTHER PUBLICATIONS

Islam et al., Framework for Automation of Cloud-Application Testing using Selenium (FACTS). Advances in Science, Technology and Engineering Systems Journal. Jan. 22, 2020;5(1):226-32.

Khan et al., A Literature Review on Software Testing Techniques for Smartphone Applications. Engineering, Technology & Applied Science Research. 2020;10(6):6578-83.

Majeed et al., Comparative Study of Open Source Automation Testing Tools: Selenium, Katalon Studio & Test Project. International Conference on Innovative Computing (ICIC). 2021. 6 Pages.

Satheesh et al., Comparative Study of Open Source Automated Web Testing Tools: Selenium and Sahi. Indian Journal of Science and Technology.Apr. 2017;10(13). 9 Pages.

* cited by examiner

Product with 5 Published TCs, 4 Executed for the build, of which 3 Passed, 1 Failed Regression:

1. Base score = 50

2. Poor Coverage = +4

3. Absolute Coverage (goal=46%): *(1+0.2*0.43)

4. Relative Coverage (product average=68%, STdev=18%): *1.000064

Adjusted Score = 59

FIG. 5

Product with 304 Published TCs, 175 Executed for the build, of which 167 Passed, 3 Failed Reg..

1. Base score = 92

2. Poor Coverage = 0

3. Absolute Coverage (goal=12%): *(1+0.2*0.79)

4. Relative Coverage (product average=8%, STdev=10%): *1.2

Adjusted Score = 100

FIG. 6

SYSTEMS AND METHOD FOR ANALYZING SOFTWARE AND TESTING INTEGRATION

BACKGROUND

Various approaches exist for facilitating construction, execution, and management of software testing. Many systems exist that help ensure that various software releases meet base levels of quality and reliability. In spite of many testing services, platforms, and other management tools, software quality is often suspect when released to the general consumer or when distributed to production environments.

SUMMARY

The inventors have realized that various conventional systems that may be comprehensive when used appropriately, lack the ability and implementation to convey an analysis of software quality that is easily understood and actionable. The inventors have realized that there is a need for a support system and technologically grounded quality scoring display. Accordingly, provided is an integrated system for assessing software quality that can capture information about any and/or all testing methodologies and various testing systems, and distill the disparate information into an actionable score of software quality. In various embodiments the assessment system is configured to analyze software builds and/or whole software products prior to consumer sales, live deployment, or deployment to production environments, among other examples.

The inventors have realized that while existing testing and review systems provide management and features for exhaustively testing a product or code release, part of the difficulty stems from not being able to tell when that product or code is "ready" to be released. In many cases, even experts cannot even agree on how to define "ready" in the context of product or software release.

Various embodiments distill the determination of "ready" using factors that impact the decision-making process to release (or not release) software. The factors can include release standards (e.g., organizational, standard bodies, etc.), and in some examples can include tunable factors that enable various users to be more risk-averse or risk-tolerant than others when making a software release decision. Other factors that the system can evaluate and report on can include a user's testing maturity and/or prior experience testing the same product, similarity to prior code, etc.

According to one embodiment, the assessment system is configured to generate a value based on testing results and analysis of a multitude of factors that impact a readiness evaluation. For example, the system generates a software quality score (e.g., an Applause Quality Score "AQS") that enables development teams to understand the level of quality they are achieving for a given release and build-over-build. In various examples, the system generates a data-driven score to enable development teams or quality assurance teams to make decisions for when a build is ready for release. In further embodiments, the system can integrate user interfaces that present a software quality score in a user dashboard that is linked to version control systems. On review and acceptance of the score, a user can trigger the release of their new code or product.

According to one aspect, an assessment system is provided. The system comprises at least one processor operatively connected to a memory, the at least one processor configured to: calculate a software quality score for a release candidate; calculate a confidence level associated with the software quality score; generate a user interface configured to display the software quality score and the confidence level associated with the software quality score; and generate a selectable visual indicator in the user interface, wherein the selectable visual indicator is configured to: trigger integration of the software build into a software product or trigger release of the software build as the stand alone software product, responsive to selection in the user interface.

According to one embodiment, the at least one processor is configured to: access test information associated with the release candidate; and generate a value associated with a plurality of bugs identified during testing and a severity associated with respective ones of the plurality of bugs. According to one embodiment, the at least one processor is configured to: adjust the value based on a status associated with respective ones of the plurality of bugs, wherein the status includes fixed and verified fixed, and the adjustment is greater for improving the software quality score for the verified fixed status relative to the adjustment for the fixed status. According to one embodiment, the at least one processor is configured to: access test information associated with the software build; generate a value associated with a plurality of bugs identified during testing and a priority associated with respective ones of the plurality of bugs.

According to one embodiment, the at least one processor is configured to: adjust the value based on a status associated with respective ones of the plurality of bugs, wherein the status includes fixed and verified fixed, and the adjustment is greater for improving the software quality score for the verified fixed status relative to the adjustment for the fixed status. According to one embodiment, the at least one processor is configured to: access test information associated with the software build; and generate a value associated with a plurality of bugs identified during testing and a bug value associated with respective ones of the plurality of bugs. According to one embodiment, the at least one processor is configured to: adjust the value based on a status associated with respective ones of the plurality of bugs, wherein the status includes fixed and verified fixed, and the adjustment is greater for improving the software quality score for the verified fixed status relative to the adjustment for the fixed status.

According to one embodiment, the at least one processor is configured to: aggregate at least one sub-score for values associated with at least one of a build severity score, build value score, or build priority score; and adjust the at least one sub-score based on a volume of testing conducted on the software build. According to one embodiment, the at least one processor is configured to: determine an absolute number of bugs relative to user defined threshold for an acceptable number of bugs; and wherein the at least one processor is configured to adjust the at least one sub-score based on the volume of testing conducted on the software build reflected in the absolute number of bugs. According to one embodiment, the at least one processor is configured to: determine a relative number of bugs based on historical information on a number of bugs identified per software build; and wherein the at least one processor is configured to adjust the at least one sub-score based on the volume of testing conducted on the software build reflected in the relative number of bugs.

According to one embodiment, the at least one processor is configured to: determine an average value for testing duration based on analysis of prior test execution or a user tunable default threshold; and wherein the at least one processor is configured to adjust the at least one sub-score based on the volume of testing conducted on the software build reflected in a difference between actual testing duration and the average value for testing duration. According to one embodiment, wherein the selectable visual indicator is configured to: analyze user defined criteria associated with at least with the software quality score or the confidence level; and disable functionality of the selectable visual indicator responsive to determining that at least a portion of the user defined criteria has not been met. According to one embodiment, the at least one processor is configured to: display an override option in the user interface, wherein responsive to activating the override option in the user interface, the at least one processor is configured to re-enable the functionality of the selectable visual indicator. According to one embodiment, the release candidate includes at least one of a software build, the software build comprising at least one of updated or new functionality to incorporate into, or operate as a standalone, software product, internet connected devices, hardware components with integrated functionality capable of testing in an electronic environment, or hybrid software and hardware devices.

According to one aspect, a computer implemented method for assessing a release candidate is provided. The method comprises calculating, by at least one processor, a software quality score for a release candidate; calculating, by the least one processor, a confidence level associated with the software quality score; generating, by the least one processor, a user interface configured to display the software quality score and the confidence level associated with the software quality score; and generating, by the least one processor, a selectable visual indicator in the user interface, wherein responsive to selection of the selectable visual indicator is the user interface, triggering integration of the release candidate into a software product or triggering release of the release candidate as a stand-alone software product.

According to one embodiment, the method further comprises: accessing, by the at least one processor, test information associated with the release candidate; generating, by the at least one processor, a value associated with a plurality of bugs identified during testing and a severity associated with respective ones of the plurality of bugs. According to one embodiment, the method further comprises: adjusting, by the at least one processor, the value based on a status associated with respective ones of the plurality of bugs, wherein the status includes fixed and verified fixed, and the adjustment is greater for improving the software quality score for the verified fixed status relative to the adjustment for the fixed status. According to one embodiment, the method further comprises: access test information associated with the software build; generate a value associated with a plurality of bugs identified during testing and a priority associated with respective ones of the plurality of bugs.

According to one embodiment, the method further comprises: adjusting, by the at least one processor, the value based on a status associated with respective ones of the plurality of bugs, wherein the status includes fixed and verified fixed, and the adjustment is greater for improving the software quality score for the verified fixed status relative to the adjustment for the fixed status. According to one embodiment, the method further comprises: accessing, by the at least one processor, test information associated with the software build; and generating, by the at least one processor, a value associated with a plurality of bugs identified during testing and a bug value associated with respective ones of the plurality of bugs. According to one embodiment, the method further comprises: adjusting, by the at least one processor, the value based on a status associated with respective ones of the plurality of bugs, wherein the status includes fixed and verified fixed, and wherein the adjustment is greater for improving the software quality score for the verified fixed status relative to the adjustment for the fixed status.

According to one embodiment, the method further comprises: aggregating, by the at least one processor, at least one sub-score for values associated with at least one of a build severity score, build value score, or build priority score; and adjusting, by the at least one processor, the at least one sub-score based on a volume of testing conducted on the software build. According to one embodiment, the method further comprises: determining, by the at least one processor, an absolute number of bugs relative to user defined threshold for an acceptable number of bugs; and adjusting, by the at least one processor, the at least one sub-score based on the volume of testing conducted on the software build reflected in the absolute number of bugs.

According to one embodiment, the method further comprises determining, by the at least one processor, a relative number of bugs based on historical information on a number of bugs identified per software build; and adjusting, by the at least one processor, the at least one sub-score based on the volume of testing conducted on the software build reflected in the relative number of bugs. According to one embodiment, the method further comprises determining, by the at least one processor, an average value for testing duration based on analysis of prior test execution or a user tunable default threshold; and adjusting, by the at least one processor, the at least one sub-score based on the volume of testing conducted on the software build reflected in a difference between actual testing duration and the average value for testing duration.

According to one embodiment, the method further comprises analyzing, by the at least one processor, user defined criteria associated with at least with the software quality score or the confidence level; and disabling, by the at least one processor, functionality of the selectable visual indicator responsive to determining that at least a portion of the user defined criteria has not been met. According to one embodiment, the method further comprises: displaying, by the at least one processor, an override option in the user interface, wherein responsive to activating the override option in the user interface, the at least one processor is configured to re-enable the functionality of the selectable visual indicator. According to one embodiment, the release candidate includes at least one of a software build, the software build comprising at least one of updated or new functionality to incorporate into, or operate as a standalone, software product, internet connected devices, hardware components with integrated functionality capable of testing in an electronic environment, or hybrid software and hardware devices.

BRIEF DESCRIPTION OF THE FIGURES

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 5 is an example process for calculation of a sub-score, according to one embodiment;

FIG. 6 is an example process for calculation of a sub-score, according to one embodiment;

DETAILED DESCRIPTION

As discussed, current commercial solutions for managing testing and release of software do not achieve the level of quality or reliability expected. The inventors have realized that the various systems fail to provide an analysis of software quality that is easily understood and actionable. According to various embodiments, the assessment system is configured to generate a value based on testing results, software management tools, and analysis of a multitude of factors that impact a readiness evaluation. In one example, the system generates a quality score with respective visualizations in the user interface. The quality score and contextual visualization enables users to immediately understand the level of quality they are achieving. In further embodiments, the system can integrate user interfaces that present a software quality score in a user dashboard that provides analysis of areas to improve, areas that meet company defined goals, etc. For example, further bug resolution may improve the quality score for a release. Once the user reviews and accepts the current score, the user can trigger the release of their new code or product.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
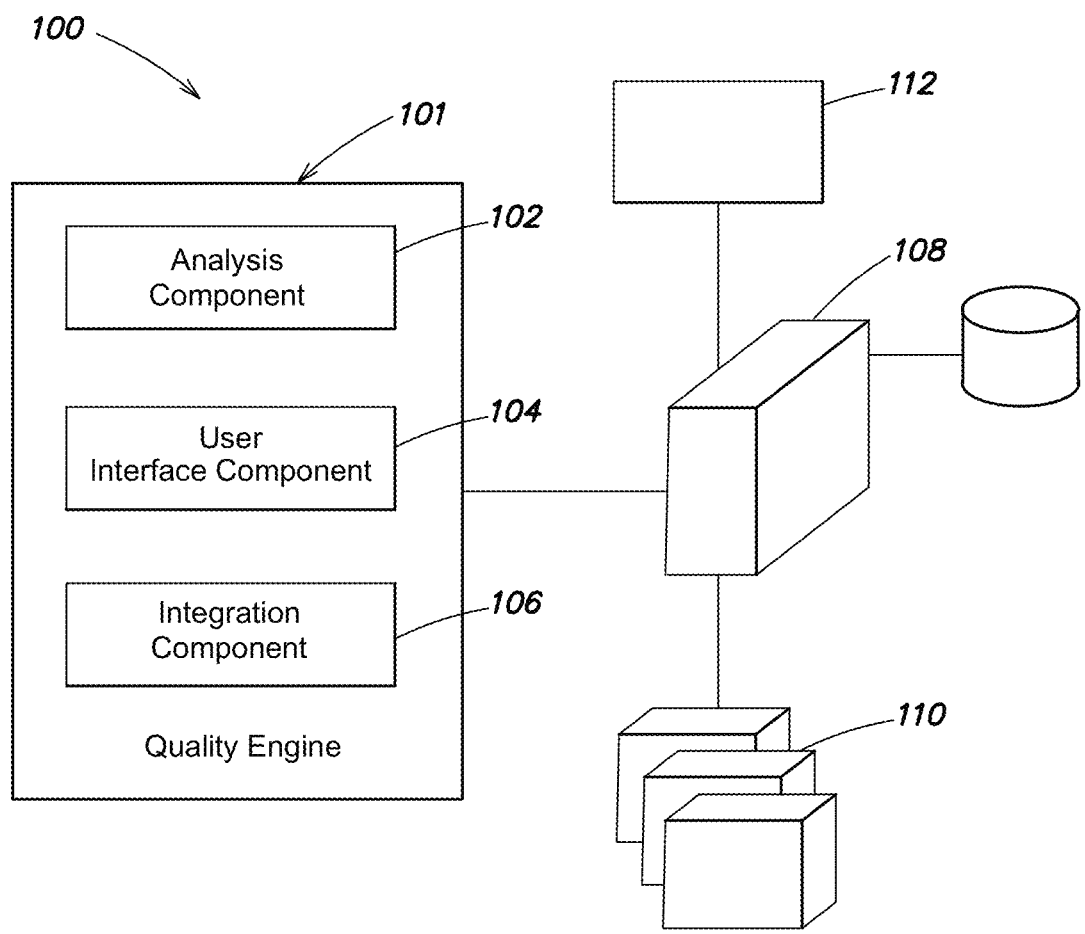
FIG. 1 shows example screen captures and editing functionality, according to one embodiment.

FIG. 1 is a block diagram of an example assessment system 100 configured to analyze testing data, software management, software development, and/or version control data, among other options to generate a readiness evaluation for a given product, code release, etc. The system 100 can include a variety of components that each execute respective functions and/or perform operations to generate the readiness evaluation and respective displays. According to some embodiments, the system can include a quality engine 101 configured to instantiate respective components on the system to perform described functions, algorithms, and/or operations. In other embodiments, the system 100 and/or engine 101 can be configured to perform the discussed functions without instantiating specific components.

According to one embodiment, the system 100 and/or engine 101 includes an analysis component configured to analyze testing data, software management, software development, and/or version control data (among other options) to generate a quality score that reflects a readiness evaluation for a given product, code release, etc.

According to one embodiment, the system generates and displays an Applause Quality Score "AQS" rating that is a calculated value ranging from 0 to 100. For example, the AQS describes the quality of testing results for a product or build during one or more test cycles. In some embodiments, the system captures and analyzes the results from any testing done and provides contextual visualization of the quality and reliability of testing/results collected. Broadly stated, the AQS rating is akin to a credit scored for software quality. Similar to a credit score, the AQS rating is configured to take into account several factors (e.g., of varying importance and/or tunable importance). In a similar manner as a credit score where credit history length, number of on-time payments, and credit utilization each factor into the output value, the system is configured to capture information on testing history/experience, similar software/code releases, similar code development, prior release history/experience, current testing performed, identified bugs, weighted valuation of bug severity, resolved bugs/issues, weighted valuation of resolve bug/issue severity, historic performance for bug/issue resolution, etc. The system can then analyze and/or weight the captured information to produce a single number that represents the software quality/readiness of a given release or product, among other options.

According to various embodiments, a quality analysis assessment system 100 and/or quality engine 101 is configured to automatically capture or accept information from integrated software development and management systems to develop a readiness evaluation. In one example, the system generates a quality score that is configured to employ a plurality of data science models. The various models can be based on several factors, including: number of issues collected by a testing community/user group; distribution of collected issues across the issue lifecycle, which can include for example, submitted issues, approved issues, exported issues housed on a customer's bug tracking system; rating of issues collected by their severity and value, for example, assessed by a software project team as well as system based predictions based on issue attributes; validity of fixing the collected issues (e.g., were they marked as 'Won't Fix,' resolved, eliminated, etc.); scope of testing, such as duration and coverage; history of testing; history of testing, resolution, and subsequent tracking; among other options.

According to various embodiments, the quality assessment generated by the system does not judge all bugs the same. For example, a more severe or valuable bug (e.g., a bug that causes an app to crash or significantly impacts the user's experience) will lower the readiness/quality score more than a less severe or less valuable bug that has minimal significance to the app's functionality or user experience. In further embodiments, the system can be configured to generate calculations of quality in near real-time and ensure an up-to-date score is presented to the user via user interface displays.

In some embodiments, the system 100 and/or engine 101 can include a user interface component 104 configured to generate displays for assessment information, as well as to build dashboard views of available testing/development information and context. According to one embodiment, the user interface component is configured to display an assessment score on a scale of 1 to 100 that reflects the readiness of a code release. The user interface component 104 is configured to convey contextual information with the assessment score. In one example, the user interface component integrates a confidence evaluation of the assessment score based on a color associated with the displayed assessment. In further embodiments, information used to develop the assessment score can be displayed in conjunction with assessment value. The user may hover over various information displays that contributed to the score, and be given a visual indication of the impact each information grouping contributed to the score and/or confidence interval. In one example, the system displays an assessment score with a completion indication (e.g., curves 910, 912, 914 of FIG. 9), and responsive to hovering over contributing information shown in the display, the display can reflect the portion of the score the hovered information contributed to the score. For example, an overlay display can be shown next to the assessment score indicating what portion of the score was contributed (e.g., 45 out of the 96 shown at 408, and an associated complete curve for the contribution). In various embodiments, the system can evaluate information groups (e.g., categories that contribute to the assessment score), and identify categories with greater potential to improve. The system can highlight these information groups for the users to visually indicate the greatest opportunity to impact the assessment score and/or a confidence value associated with the assessment score.

In various embodiments, the quality assessment system 100 can be part of a larger testing/development platform, where each has access to the data and information produced by either. In other embodiments, the assessment system 100 and/or engine 101 can include an integration component 106 configured to interact with external software development, software testing, version control and/or bug tracking systems (e.g., 108). In some embodiments, the system 100 can include a plurality of application programming interfaces configured to communicate with external software development systems (e.g., JIRA, GITHUB, etc. (e.g., 108)), and capture or access software development and/or testing information. In further embodiments, the system can capture or access all development/testing information available from external systems to incorporate into an assessment of readiness of a current software build, release, or product. In other embodiments, the system can filter available development/testing information to match a current build or release (e.g., same product, same functionality, similar product, similar functionality, etc.). Still others can weight the available information on similarity, giving matching testing/development information a greater weight than other testing/development information. In one example, the system can employ natural language understanding engines to determine a test/development context for captured information and use the determined context to determine similarity to a current test/development context, among other options.

The user interface component can be configured to associate color displays with the assessment score to convey contextual information: green: between 90 and 100 (e.g., likely ready for release); yellow: between 66 and 89 (possibly ready for release); and red: 65 and lower (e.g., likely not ready for release).

Figure 9:
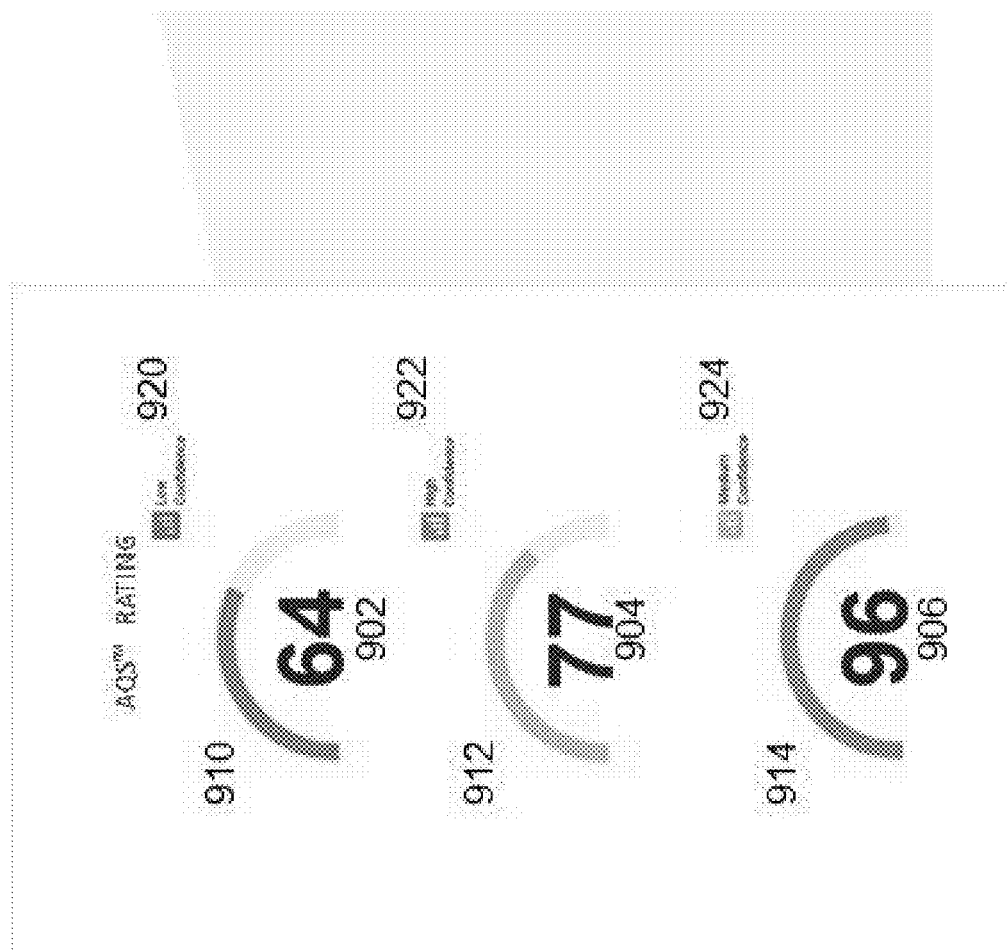
FIG. 9 is a screen capture of a visual element for displaying quality scores and/or confidence scores.

In the example shown in FIG. 9, there is an Applause Quality Score for three different builds (e.g., at 902, 904, and 906). The first score in red is low and is made with low confidence (e.g., 920). The second score in yellow (77) is in the middle range and is made with high confidence (e.g., 922). The third score in green is high and is made with medium confidence (e.g., 924). As shown in FIG. 9, the quality score rating can be paired with a confidence level determined by the system to rate a confidence evaluation of the system generated quality score. For example, the confidence level for an individual score can be based on the scale and scope of the testing conducted for the build such as duration and coverage, as well as the breadth of historical data collected on previous builds of the product or app, among other options. In various examples, as a user conducts more thorough testing over a period of time, the confidence level will rise.

In various embodiments, the AQS rating is a piece of the analysis that can be delivered by a testing platform that enables users to consider the underlying data that the score is built on, as well as factors that were not considered in developing your build's score. In further embodiments, the system and/or user interface component 104 is configured to generate displays to evaluate the build's AQS rating against the above objective ranges (low, medium, high); to understand the underlying nature of reported issues, their severity and value, type and status, as well as the product components they were reported on (e.g., over time that system can identify irregularities that direct users to better identify root causes); to evaluate the build's score against those of preceding builds, among other options. For example, a specific build might not generate a "high" score from the beginning, thus a goal for the specific build may be to have a steady, positive trend in the assessment score. In another example, if a first build scored a 60—which is in the 'low' category—and the second build scored a 75, the system identified strong progress and the context in which the improvement in assessment takes place. Further, the system can indicate that there remains room for improvement, and even allow the user to identify areas for improvement that can contribute the greatest impact.

In other embodiments, the system is configured to facilitate all phases of a software development lifecycle ("SDLC"). Naturally, the quality you expect for the initial build of a release will differ from what you may expect from the release candidate and the system is configured to track quality across phases of the SDLC and provide displays of quality over time for a product, build, and/or release candidate. In further embodiments, the system can be configured to incorporate the results from a full regression, and/or spot-check testing (e.g., for a hot fix), and weight the impact each evaluation has on the overall quality score. In further embodiments, the system is configured to accept user input on how to value information used in calculating software quality. For example, as a user reviews a build, and build-over-build trends (e.g., quality score timeline), the user can adjust how important various factors are that are used in the calculation.

In many conventional settings, the users and/or development teams have been traditionally viewed as providing the best assessment as to when their software may be ready, however, human factors often provide inconsistent results. For example, bias can affect the "ready" assessment and lead to omissions, oversights, and errors in testing. Various embodiments implement a quality score that can address many of these issues. Further embodiments can also leverage the benefit of user and developer knowledge by enabling users to submit, modify, or adjust weight values used in scoring quality based on what is important to them. In such implementations, the system enables the user to convey information that would otherwise be invisible to the system. In some examples, users can import information about testing via external systems, incorporate testing information from unconnected systems, incorporate information on personnel changes, and include other considerations.

In still other embodiments, the system can implement machine learning models that can be used to make adjustments to various weighting in the quality score analysis. For example, the system can capture information on user-based changes to weighting factors, and train machine learning models on those changes and any characteristics that are associated with them. Pattern matching by the trained models enables the system to make similar adjustments in similar circumstances. The system can also recognize when changes made by the users result in reduced accuracy and/or confidence. In some embodiments, responsive to changes by the users, the system can automatically adjust a confidence determination. In one example, the system reduces a confidence score responsive to user customized values in the determination. Over time the system is configured to adjust the confidence score upwards to eliminate the customization penalty to confidence values.

In various embodiments, users can evaluate their builds or software release candidates based on a quality rating and contextual information on a confidence level associated with the quality rating. In some settings, the system can include functionality to trigger the release of a build from development environments (e.g., 110), to live or production environments (e.g., 112) based on selections in the user interface. In some embodiments, the system can present evaluations of user based criteria for release in the user interface (e.g., threshold quality score, threshold confidence score, threshold testing requirements (e.g., test coverage percentage, test cycle execution, threshold percentage of unresolved bugs, etc.)). The user interface can be configured to disable the release functionality in response to missed criteria. For example, a release build now button can be displayed as grayed out in the user interface, based on missed release criteria. In further embodiments, a user can select override functions in the user interface to re-activate the grayed out option. A warning message can be displayed in conjunction with such override functionality—"You missed (example criteria). Are you sure you want to enable release?" Other embodiments can employ different warning messages. In still other embodiments, various user levels and permissions can be assigned, and include levels of override capability. For example, a user can assign a "no override" status to specific criteria—in which case, the system is configured to report back to the user the condition and an inability to override at the current permission level. In further example, a privileged user may be required to delete the non-override status before permitting release of the associated build. Alternatively, if further testing is done to meet the criteria, the system can permit release without override.

In some embodiments, the system can highlight testing information relevant to a missed criteria. The user may then navigate to information sources that would allow the missed criteria to be improved. For example, test execution percentages may be the missed criteria, and the system is configured to highlight the published test information and the executed test information. In further embodiments, the system can automatically generate a recommendation and display based on the missed criteria—"Execute more published tests to bring the quality score up."

Figure 2:
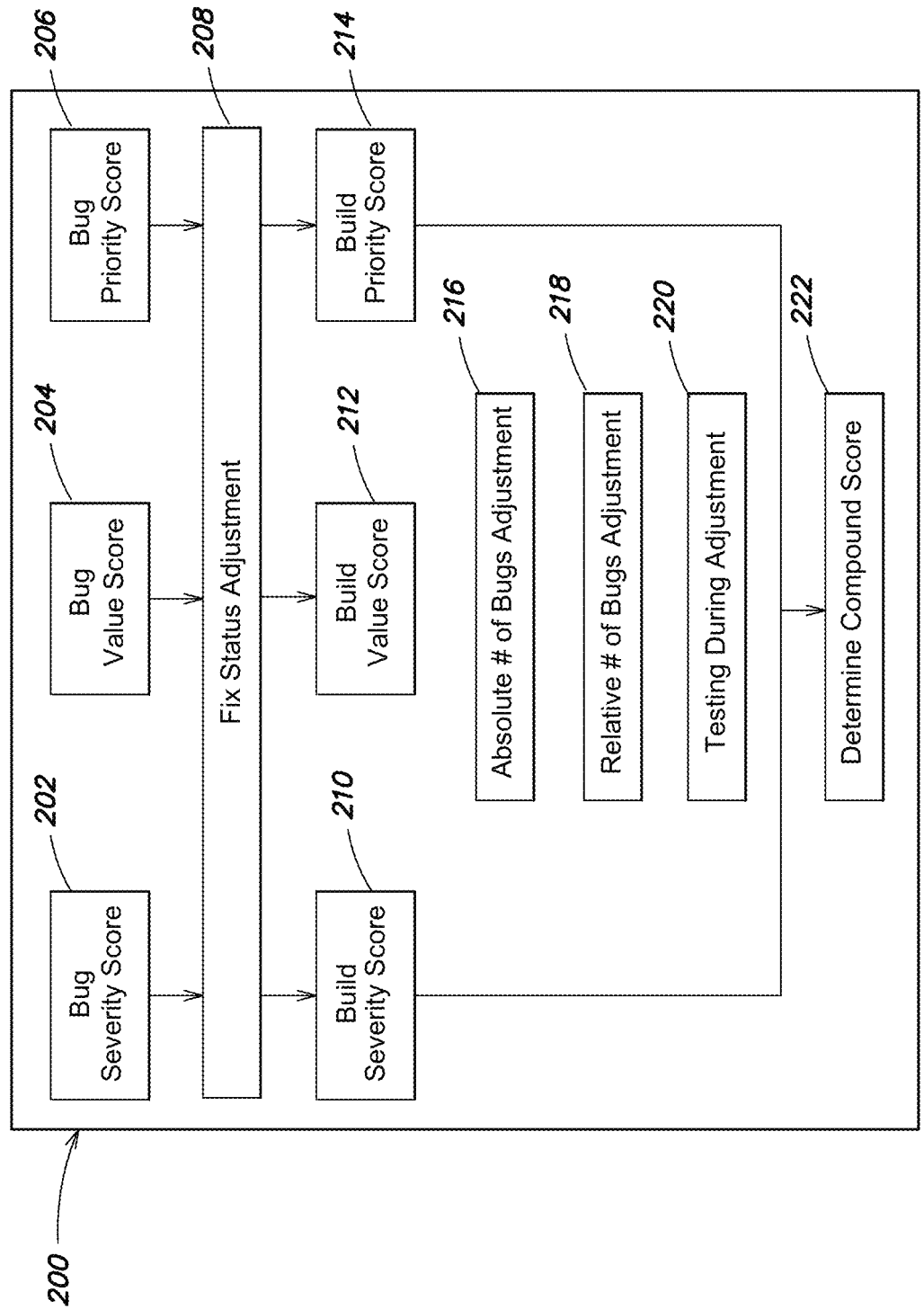
FIG. 2 is an example process flow to determine a software quality score, according to one embodiment.

FIG. 2 is an example process flow 200 used in determining a software quality score. In various embodiments, different information values can be used to generate a quality score. For example, an exploratory score can be built from subjective information as well as objective information. In one embodiment, the process includes a plurality of information sources that contribute to the calculation. In one embodiment, the information source can include a bug severity score 202, a bug value score 204, and a bug priority score 206. According to some embodiments, a bug severity score (e.g., 202) can be set by a tester once a bug report is submitted. In some examples, the tester submission is confirmed during a review. In other examples, a bug severity can be changed in a test audit and the changed value used in the determination of an overall quality score. In further embodiments, a bug value is set by an administrative user or an improver during test triage or review. Similarly, bug priority scores can be established by the system user (e.g., a customer). In some examples, a bug submission system is used to capture information on a software bug including, bug severity and/or bug value. The bug submission system can be configured to assign a bug priority score based on submitted information. In some alternatives and/or additional embodiments, the system can assign a bug priority score based on information contained in a bug submission. In one example the system can be configured to match bug information to customer defined criteria and assign a bug priority score accordingly.

At 208 the initial scores for severity value and priority can be adjusted based on status information associated with a given bug. In some embodiments, bug scoring is configured to reflect a software quality penalty in that bugs with a higher priority and/or greater severity reflect more value to the customer and their software thus have a larger impact on determining a software build that has lower quality. In some examples, the values assigned for severity and bug value score can be based on the number of categorizations. In one example, bug severity scores are based on low, medium, high, and critical severity levels and each category can be assigned an increasing severity value (e.g., low—one, medium—two, high—five, critical—13). Various embodiments use a Fibonacci progression for assigning numerical values to the respective categories, however other increasing values can be used. In another example, bug value score categories can include no value, somewhat, very, and exceptional. The categories can be assigned numerical values (e.g., know value—one, somewhat—two, very—five, exceptional—13). Similar to severity, the numerical value can be based on a Fibonacci progression, however other increasing values or progressions can be used.

Based on capturing all bug values (e.g., severity, value, priority) the system establishes a score for each bug based on the assigned values and adjusts the assigned values based on the bug status (e.g., 208). According to one embodiment, numerical values are reduced based on a bug being fixed and/or having the fixed verified. In one example, numerical values assigned to each category can be significantly reduced based on a fixed being made to the bug and further reduced based on a fixed being made to the bug and the fix being verified. Table A illustrates example adjustments that can be made to bug severity scores. In other embodiments, similar adjustments may be made to bug value scores.

TABLE A

Bug Severity Scores

| Bug Fix Status | Low | Medium | High | Critical |
|---|---|---|---|---|
| Not Fixed | 1 | 2 | 5 | 13 |
| Fix Not Verified | 1 | 1 | 2 | 5 |
| Fix and Verified | 1 | 1 | 1 | 2 |

Table B illustrates example adjustments that can be made to bug priority scores.

TABLE B

Bug Priority Scores (6 Priority Levels)

| Bug Fix Status | P6 | P5 | P4 | P3 | P2 | P1 |
|---|---|---|---|---|---|---|
| Not Fixed | 1 | 2 | 3 | 5 | 13 | 21 |
| Fix Not Verified | 1 | 1 | 1 | 2 | 5 | 8 |
| Fix and Verified | 1 | 1 | 1 | 1 | 1 | 3 |

Other example adjustments may be made to severity and/or priority scores. In further embodiments, additional priority levels may be used, and thus the numerical values and adjustments made to them can change based on what testing targets are important to a given user, how many priority levels are defined, etc.

Process 200 continues with the aggregation of the adjusted bug severity scores into a build severity score at 210, the aggregation of the adjusted bug value scores into a build value score 212, and the aggregation of the adjusted bug priority scores into a build priority score at 214.

According to some embodiments, once values are aggregated process 200 may include steps to calculate a simple average of severity, value, and priority. In addition, the average values can be normalized to yield the final build severity, build value, build priority score—which may be executed as part of 210 through 214.

Figure 12:
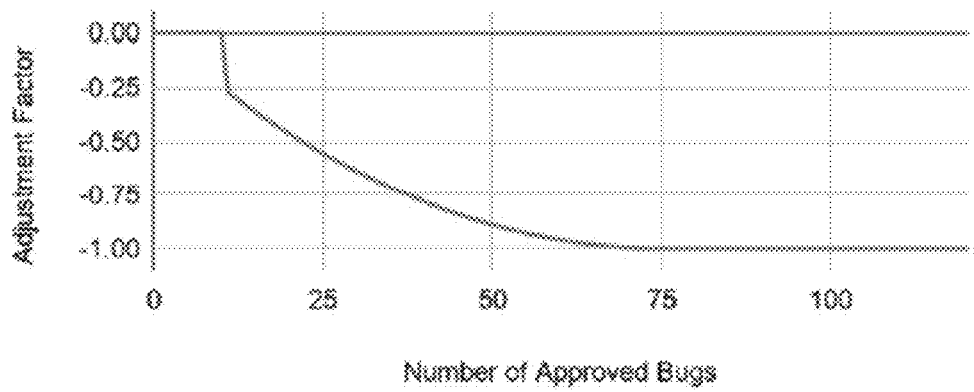
FIG. 12 illustrates a calculation for an adjustment factor based on a number of approved bugs for a build or project, according to one embodiment.

Process 200 can continue at 216 with adjusting the value scores by an expected or reasonable number of bugs that would normally be generated per build for a software product. In various embodiments, process 200 may reference a database of prior builds and/or software projects and leverage numbers of bugs of prior testing to establish a reasonable number of bugs that the system can use as part of the adjustment process. According to some embodiments, using an adjustment on an absolute number of bugs enables more accurate comparison of testing results across builds of products, across the different phases in the product lifecycle, across different product types, and across products serving different industries. In other embodiments, the system can allow end-users to define a number of approved bugs that will be used to calculate the adjustment factor. In one example, FIG. 12 illustrates a calculation for an adjustment factor based on a number of approved bugs for a build or project.

In other embodiments, users may tailor the adjustment factor being employed to customize their quality score.

Figure 13:
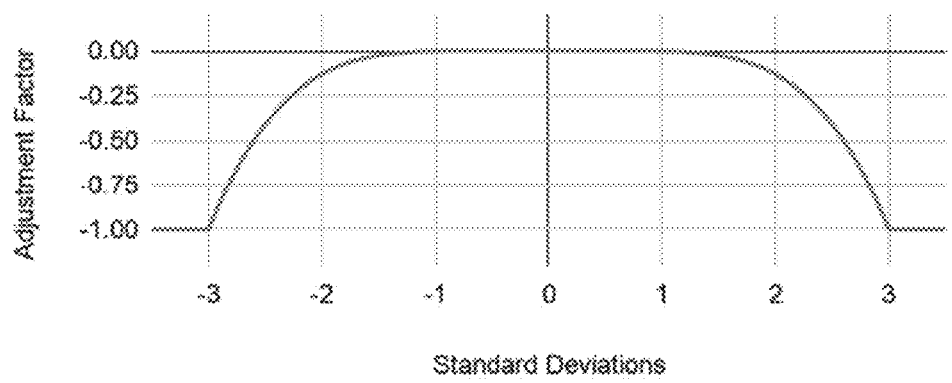
FIG. 13 illustrates an example adjustment factor based on standard deviations from a one year product average for bugs, according to one embodiment.

In further embodiments, process 200 continues with an adjustment to the scores based on a relative number of bugs (e.g., 218). The relative number of bugs adjustment can be based on an expected number of bugs per build/project. In the relative number of bugs step, the process uses results previously collected on a given build/project to estimate an expected number of bugs that will be generated. In one example, the magnitude of adjustment is determined as a function of quality for the number of bugs for the build is from a one year running product average. The determination of how far can be based on standard deviations. In one example, FIG. 13 illustrates an example adjustment factor based on standard deviations from a one year product average for bugs.

Figure 14:
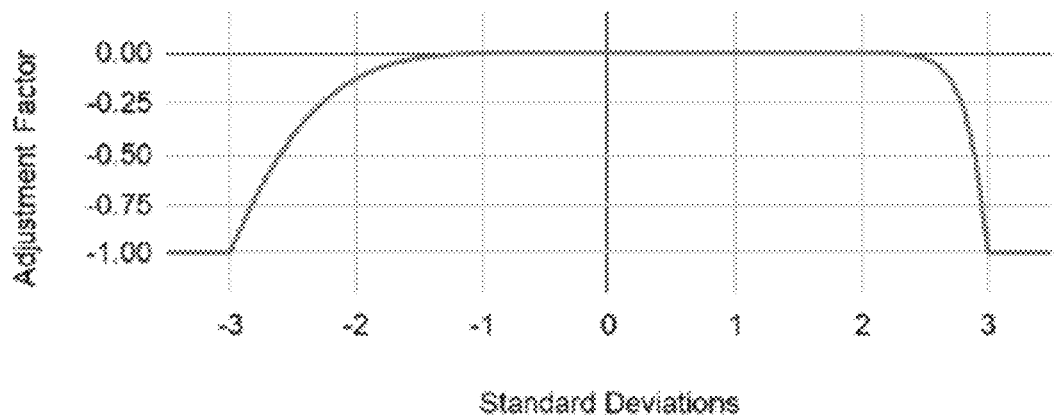
FIG. 14 is an example adjustment factor based on standard deviations from a one-year product average for testing duration, according to one embodiment.

According to one embodiment, process 200 continues with an adjustment based on testing duration (e.g., 220). In various embodiments, the adjustment can be based on observed testing durations for previously executed test cycles on a product, build, or release. In one example, the magnitude of adjustment is a function of how far the testing duration for the build is from a one year running product average in terms of standard deviations. Other adjustments can be used including different time periods for running product average as well as various distribution curves instead of standard deviation, among other options. Shown in FIG. 14 is an example adjustment factor based on standard deviations from a one-year product average for testing duration.

Once the various adjustments have been completed (e.g., 216 through 220), process 200 defines a compound testing score used in determining a software quality score. In some embodiments, the calculation of the compound testing score can be based on user facing configurations. In one example, users can specify that bug value be used or not used, severity used or not used, priority used or not used in determining the compound testing score. According to one embodiment, each scoring component (e.g., build severity, build value, and build priority score) can be added together once multiplied by a weighting factor. In one example, Table C shows example values that can be used as the weighting factor, and the various weighting factors can be selected based on user facing configurations.

TABLE F $$S_1 \times \begin{pmatrix} \text{Build} \\ \text{Severity} \\ \text{Score} \end{pmatrix} + V_1 \times \begin{pmatrix} \text{Build} \\ \text{Value} \\ \text{Score} \end{pmatrix} + P_1 \times \begin{pmatrix} \text{Build} \\ \text{Priority} \\ \text{Score} \end{pmatrix}$$

Exploratory Testing Coefficients

|  | Severity Used | | Severity Not Used | |
| --- | --- | --- | --- | --- |
|  | Value Used | Value Not Used | Value Used | Value Not Used |
| Priority Used | $S_1 = 0.2$ $V_1 = 0.2$ $P_1 = 0.6$ | $S_1 = 0.2$ $V_1 = 0$ $P_1 = 0.8$ | $S_1 = 0$ $V_1 = 0.2$ $P_1 = 0.8$ | $S_1 = 0.2$ $V_1 = 0$ $P_1 = 0.8$ |
| Priority Not Used | $S_1 = 0.8$ $V_1 = 0.2$ $P_1 = 0$ | $S_1 = 1$ $V_1 = 0$ $P_1 = 0$ | $S_1 = 0$ $V_1 = 1$ $P_1 = 0$ | — |

According to some embodiments, process 200 may include optional steps that are used to validate the calculation of a compound score. For example, process 200 may include validation conditions to return a valid compound score. In one embodiment, process 200 may require a minimum testing process that can be executed in order to return the compound score. In one example, process 200 may evaluate a number of test cycles used on a given builder product. If no test cycles were run, process 200 assigns a null value to the compound testing score. If only one test cycle was executed, process 200 may test whether the test cycle was accepted by at least one tester. If not accepted, process 200 returns a null value. Otherwise, the calculated value will be output. Additional validation conditions can be tested. In one example, process 200 will test if a minimum number of bugs has been returned during testing. If the minimum is not met, process 200 returns a null value.

Figure 3:
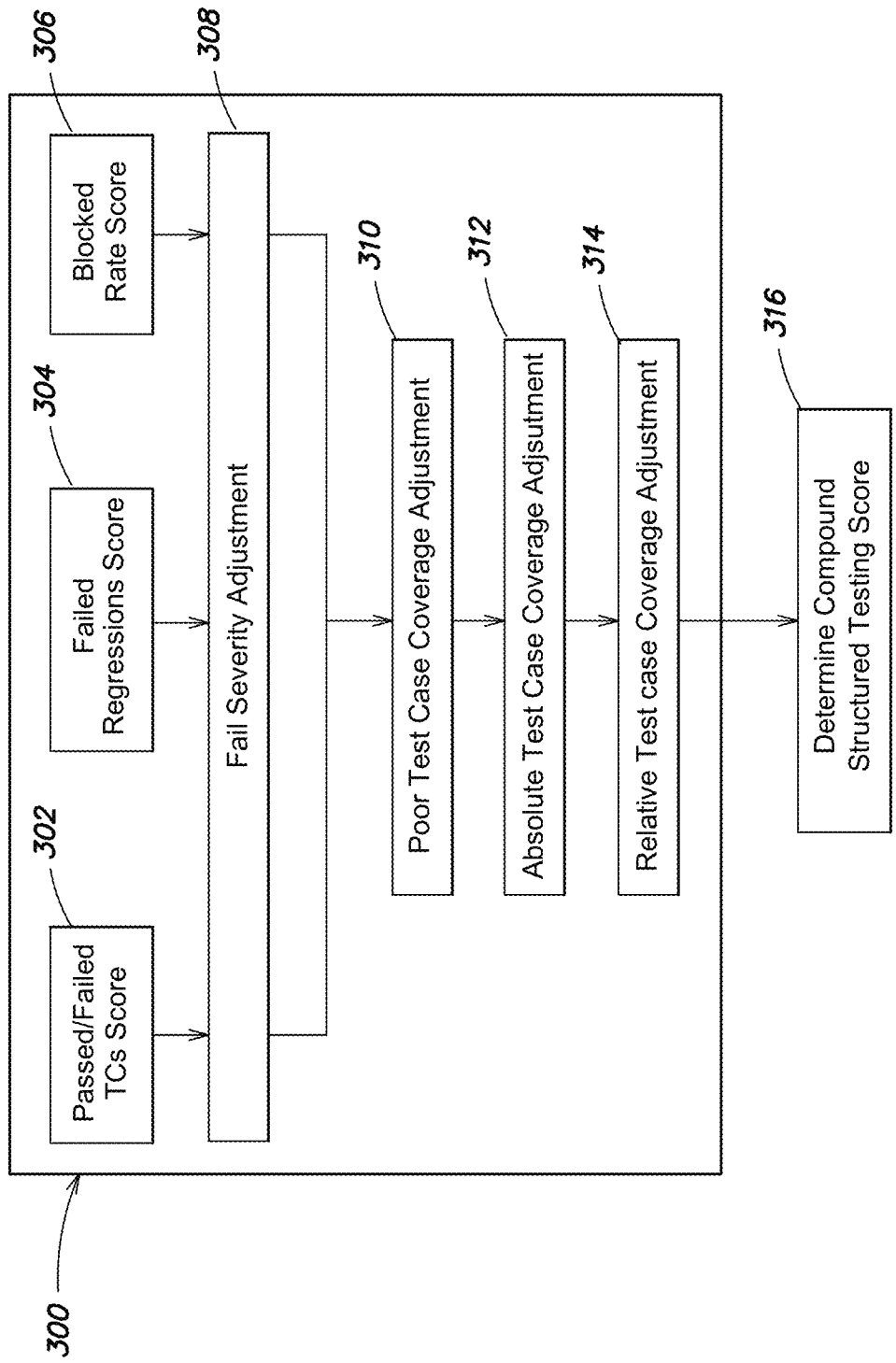
FIG. 3 is an example process flow to determine a software quality score, according to one embodiment.

FIG. 3 is an example process flow 300 for generating a compound structured testing score. In various embodiments, the testing scores generated in FIG. 2 and FIG. 3 can be combined to yield a software quality score. Process 300 can be used to analyze a plurality of information sources. For example, scores may be generated based on passed/failed test cases (e.g., 302), failed regressions (e.g., 304), and blocked rate (e.g., 306).

According to one embodiment, regression test cases are used to track test cases that passed on at least one previous build and validate that new changes/new code have not impacted existing functionality. Blocked rate refers to the test cases that could not be executed because of external dependencies—for example, the test environment was not ready for the test case.

Process 300 can continue at 308 with adjusting the various scores based on a fail severity. In one example, failed regression test cases are weighted greater than failed non-regression test cases. In some examples, the penalty can be proportional to the number of test cases that were executed. In other examples, the penalty can be used to reflect that regression test cases could impact software quality at a greater rate than non-regression test cases. In one embodiment, process 300 uses a three times multiplier for weighting field regression test cases over nonaggression test cases.

Figure 15:
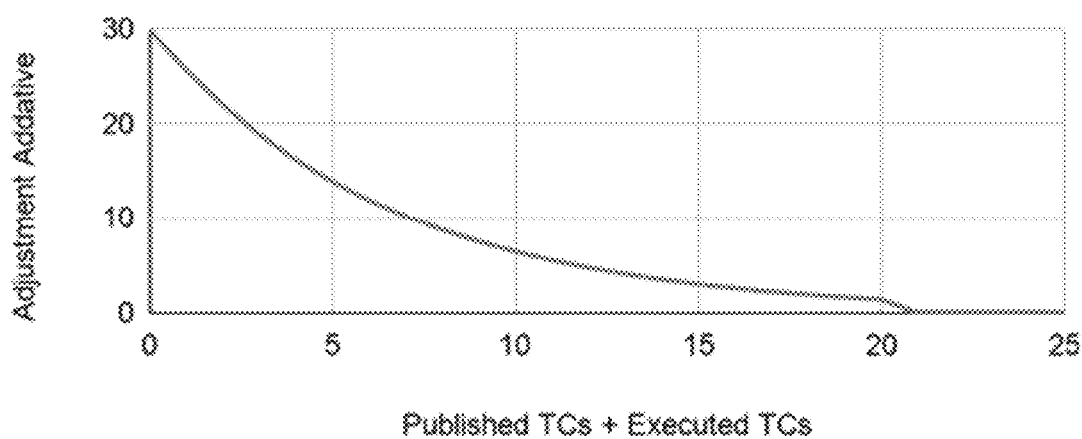
FIG. 15 illustrates an example adjustment that can be made based on poor test case coverage, according to one embodiment.

Process 300 can continue at 310 with adjustments to the compound structured testing score calculation. For example, a poor test case coverage adjustment may be made at 310, based on a number of published test cases and a number of executed test cases. For example, step 310 can multiply a number of published test cases with the number of executed test cases, and if the result is less than or equal to the threshold (e.g., 20), a poor coverage adjustment can be made. FIG. 15 illustrates an example adjustment that can be made based on poor test case coverage.

Figure 16:
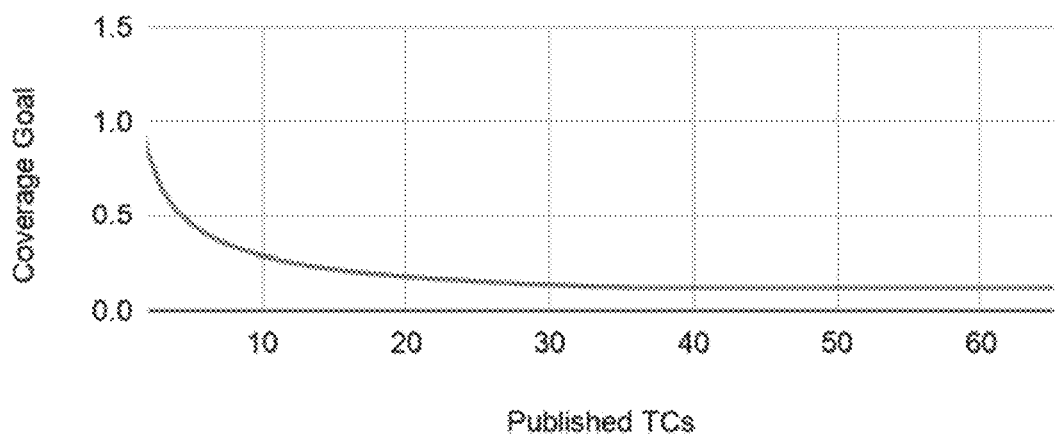
FIG. 16 illustrates an example adjustment that can be used based on a testing coverage goal when compared to a published set of test cases, according to one embodiment.

Additional adjustments can be made that provide an absolute test case coverage adjustment factor. For example, process 300 can continue at 312 with an adjustment based on absolute test case coverage. FIG. 16 illustrates an example adjustment that can be used based on a testing coverage goal when compared to a published set of test cases.

Other adjustments can be used, and adjustments may be based on a comparison of actual coverage versus coverage goal. In one example if actual coverage is greater than a coverage goal, the adjustment can be based on subtracting the coverage goal from actual coverage divided by the actual coverage in terms of the number of test cases. In another example if average coverage is less than or equal to a coverage goal the adjustment value can be based on subtracting the coverage goal from the actual coverage divided by the coverage goal.

Figure 4:
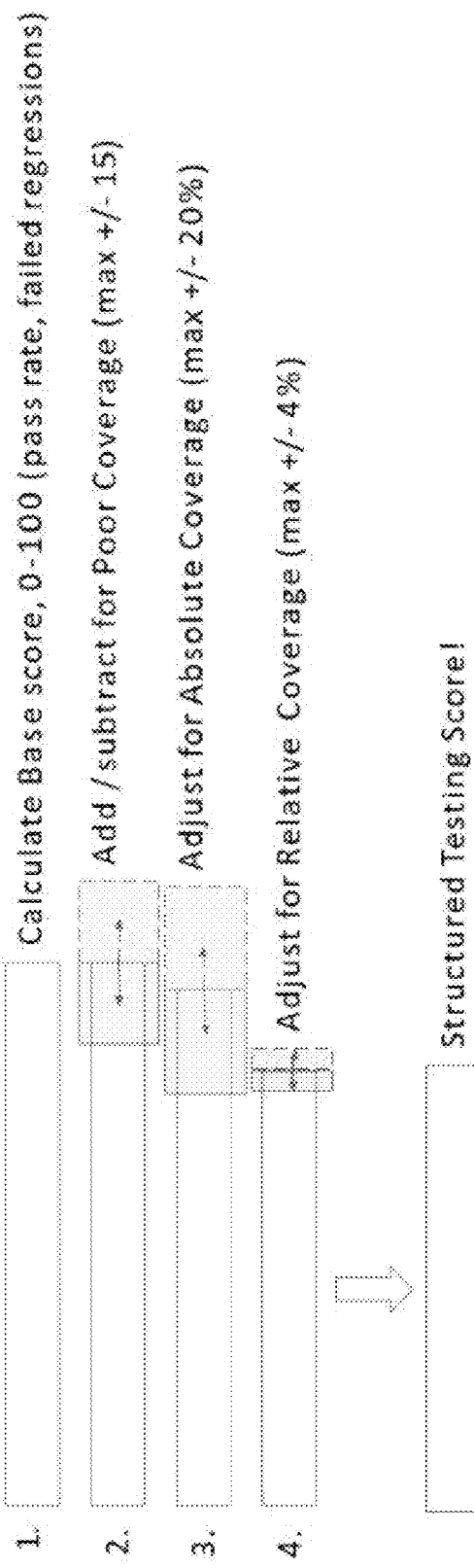
FIG. 4 is an example process flow to determine a software quality score, according to one embodiment.

Additional adjustments can include a relative test case coverage adjustment (e.g., at 314). In some embodiments, the relative coverage adjustment factor can be based on an average coverage per build reduced by actual coverage and divided by a standard deviation analysis of the two values. Once the adjustments are made (e.g., 310-314), process 300 can conclude with the determination of the compound structured testing score at 316. FIG. 4 illustrates an example algorithm that can be used to determine a compound structure testing score. FIG. 4 describes example adjustments can be made in calculating the final score. FIGS. 5-6 illustrate example executions that generate structured testing scores and applications of adjustments to determine the final adjusted scores.

Once the compound scores are generated (e.g., FIG. 2, FIG. 3), the software quality score can be determined from underlying compound scores. In one example, software quality score can be computed based on a weighted average of the underlying compound scores. According to some embodiments, users can assign weight values to underlying sub-scores, and the system is configured to calculate a software quality score based on the weighted average and the assigned weights. In one example, the system can present a user interface that allows the user to enter specific weight values. In another example, the system can present a sliding scale that allows the user to move a visual indicator along the position displayed between test sub-scores. For example, an exploratory testing sub-score may be shown on one side of the sliding bar and a structured testing sub-score may be shown on the opposite side. The user interface is configured to allow a user to manipulate a visual indicator between the two scores, and thus assigning a weight value to each reflective of the position of the visual indicator.

In some embodiments, the system can calculate a software quality score based on a simple average of the underlying sub-scores. In further embodiments, the system can be configured to display different calculations of a software quality score and indicate the basis on which the software quality score was calculated (e.g., simple average, weighted-average, user-defined weighting, etc.). In some embodiments, the system can be configured to determine a weighted average that is based on historical testing profile of the software product or build. For example, by examining how the product was tested in the past, the system can determine what the customer might deem as more "meaningful" or "important" and set the weights for the quality score accordingly. In further embodiments, the system can execute AI algorithms to identify the weights for a quality score, through a feedback loop. For example, the system can analyze the software product's history along with history collected on other products as well as additional indicators that can be used to dynamically calculate the weights. In still other embodiments, hybrid approaches that employ weighted averages and AI algorithms can be implemented to develop weightings used. In one example, both calculations are used and an average value from the two approaches can be used. In another example, the system can use a primary approach (e.g., weighted average or AI) and use the secondary approach to adjust weights determined by the primary approach, among other options.

According to some embodiments, in conjunction with a software quality score the system generates and displays a confidence evaluation of the software quality score. According to some embodiments, the system is configured to evaluate a number of dimensions to determine a confidence level in the calculated quality score. For example, the system can evaluate the maturity of the products testing implementation (e.g., enough data was collected on previous builds, enough data was collected during previous test cycles, product is properly set with active components, prior releases and/or builds made lives and met company goals, etc.). In another example, the system can evaluate if a software build was sufficiently tested (e.g., expected total testing duration, expected number of testers, expected number of Geos (e.g. tester countries), expected number of device environments, etc.). Other example dimensions that the system can evaluate in determining a confidence level to include the reliability of the executed exploratory testing. (e.g., threshold number of bugs completed triage, bug priority is aligned with a bug tracking system and definitions, issue backlog is properly managed, etc.), and the reliability of the executed exploratory testing (e.g., enough test cases have been published (e.g., threshold number of published test cases has been met), expected number of runs per test case has been met, expected coverage threshold has been met (e.g. executed test cases out of published test cases), etc.).

Figure 7:
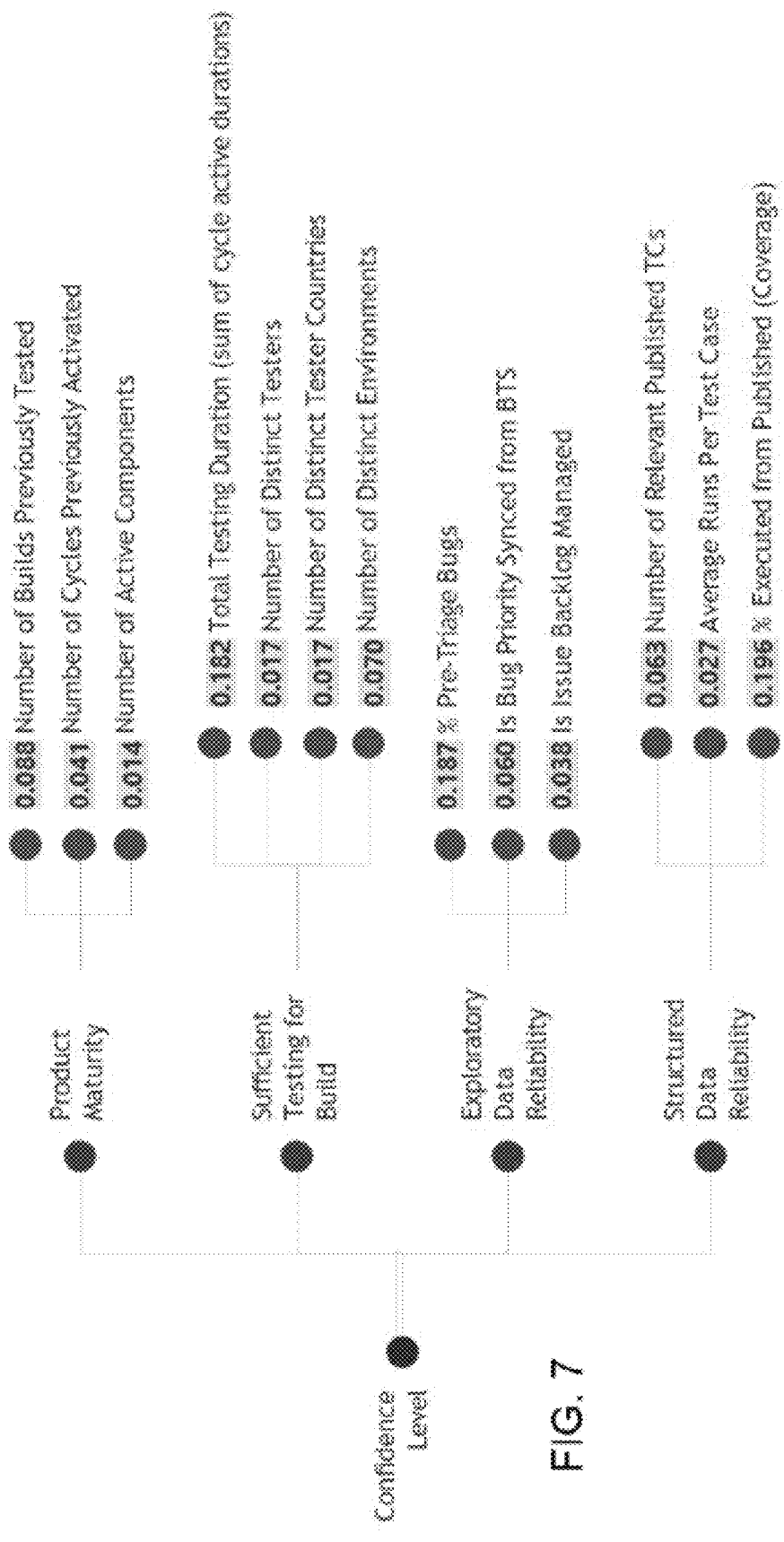
FIG. 7 illustrates example dimensions to analyze for determining a confidence level, according to one embodiment.
Figure 8:
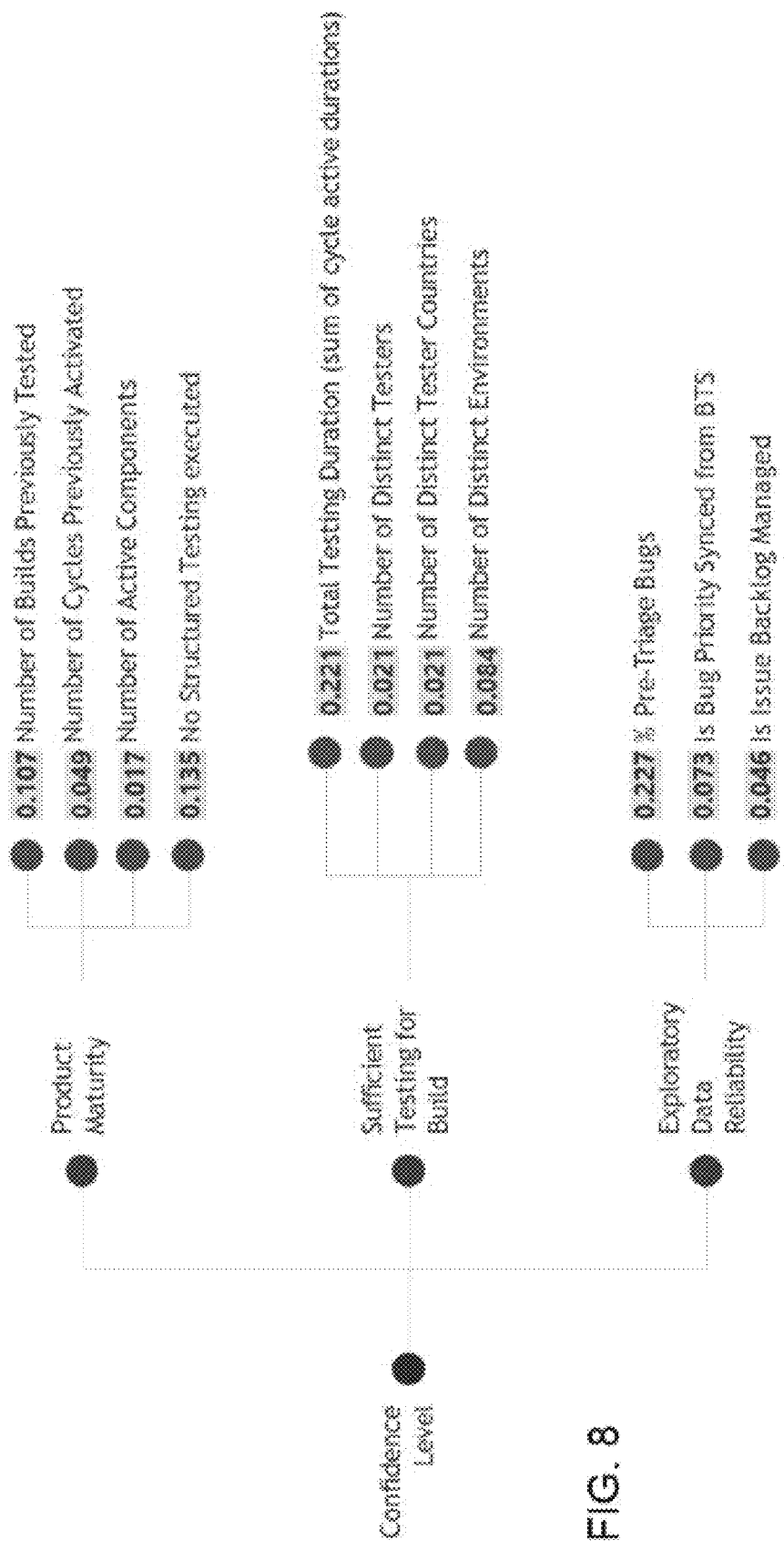
FIG. 8 illustrates example dimensions to analyze for determining a confidence level, according to one embodiment.

FIG. 7 illustrates an example evaluation of a confidence level based on a plurality of confidence coefficients. The confidence coefficients can be organized based on a number of categories. For example, the categories can include product maturity, sufficient testing for build, exploratory data reliability, and structured data reliability. In some embodiments, the confidence coefficients that will be evaluated are dependent on whether or not structured testing is part of an evaluation. FIG. 7 illustrates an example with structured testing. FIG. 8 illustrates an example where no structured testing is used as part of the evaluation. Returning to FIG. 7, the dimensions that are factored into the confidence determination include: the number of builds previously tested; number of cycles previously activated; the number of active components in the test execution; total testing duration (e.g. some of cycle active durations); number of distinct testers; number of distinct tester countries; number of distinct environments; percent per—triage bugs; evaluation of bug priority—synced from bug tracking system or not; is issue backlog managed; number of relevant published test cases; average runs per test case; percent executed from published (e.g. coverage evaluation); etc.

According to some embodiments, the confidential coefficients are given individual weights that add up to 100. The confident score can then be calculated as a sum of products between dimension values and coefficients. The score is then translated into one of four confidence levels: very low (0 to 35%), low (35 to 65%), medium (65 to 85%), and high (85 to 100%). In various embodiments, the system is configured to limit user exposure to the determined confidence level. In other embodiments, the user can see the confident score on a display of the confidence levels. In still other embodiments the system may be configured to display the percent score assigned to the confidence level.

FIG. 9 is a screen capture of a user interface element showing quality scores for three build examples. Various embodiments can incorporate additional functionality into the displayed quality score as well as the display confidence level. For example, a learn more visual element (not shown) can be displayed with a quality score. According to some embodiments, the system can analyze contributing factors from the calculated quality score to identify score having the greatest impact on a low, medium score, and/or high score. In one example, low scores can be analyzed by the system to identify contributing calculations with the greatest deviation from its potential contribution to the overall score. The system can then generate a display associated with the contributing facet or analyzed dimension and at least summary information, for example, of the underlying test data. To provide additional examples, where test coverage score contributed greatly to a low score (e.g., relative to other scoring factors), hovering over learn more can provide a recommendation to execute more published test cases to increase the quality score. The recommendation can be displayed as part of an overlay that provides summary information on the published test cases and information on the actual executions. In further embodiments, the system can project new quality scores based on assuming further test case execution, and show potential quality scores that would result from increasing execution by various percentages (e.g., 10%, 20%, 30%, . . . 80%, 90%, etc.). In some examples, the system can be configured to determine if increased values can move the quality score into another level (e.g., low to medium, medium to high, etc.) and provide those calculations as recommendations.

In further embodiments, the system can determine that adjustments to individual factors alone will not move the score into a new category, and the system can project options for how many factors/dimensions need to be improved to reach a quality score level.

Figure 10:
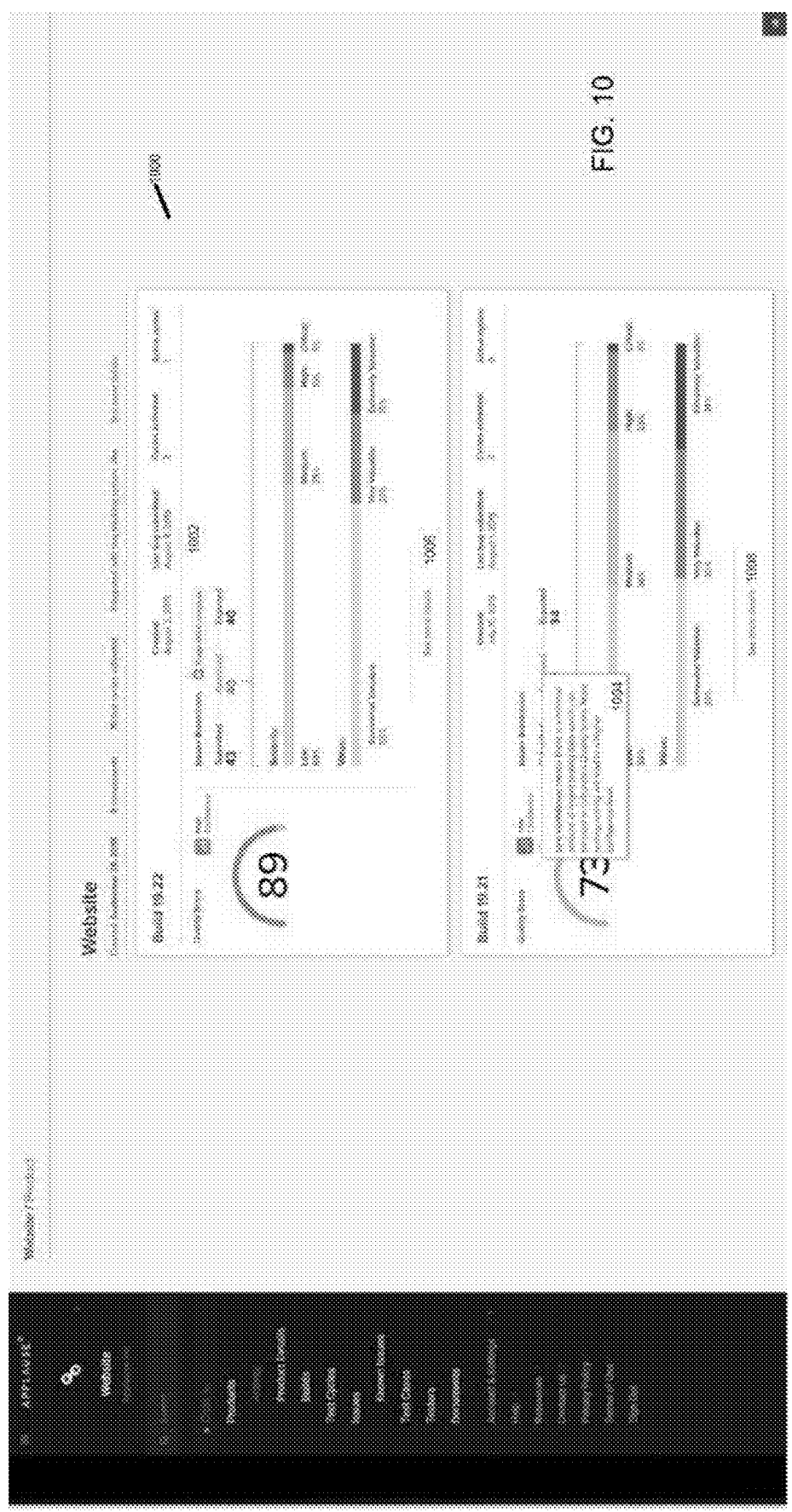
FIG. 10 is a screen capture of an example quality score dashboard, according to one embodiment.

FIG. 10 is an example screen capture of a quality score dashboard view 1000. According to one embodiment, quality scores can be shown with confidence levels. In further embodiments, the quality score may be accompanied by additional information to provide additional context for the ultimate score. For example, at 1002 an issues breakdown interface is provided. In this display, bug tracking information is presented to the user to provide context. According to one example, the user can access information on specific bugs and/or aggregate information on issues identified by a bug tracking system. For example, the distribution of bug severity for the identified issues can be displayed as well as any bug value associated with the identified issues. Shown in the interface at 1004 is an option to access more details. Responsive to selection of 1004 the system can provide additional information and/or recommendations on improving a quality score and/or a confidence level associated with the quality score. In some examples, the system can highlight factors or dimensions that had the greatest relative contribution to the score, and present those responsive to selection of see more details in the user interface.

According to some embodiments, hovering over a score or level in the user interface will trigger an overlay display. For example, at 1004 shown is an educational or informational display regarding the confidence level associated with the quality score of 73. In further example, the overlay display may also include an option to select "see more details" (not shown). In various embodiments, the display may also include an option for see more details at 1008. When selected, the system is configured to transition the user interface to recommendations on contributing factors used in determining score, and how to improve those factors and/or the overall score.

According to one embodiment, selection of see more details may cause the dashboard display to shift left in the user interface, to allow room in the user interface to introduce summary views associated with the contributing factors/analyzed dimensions on the right side of the user interface. In some embodiments, the summary views may include detailed information that makes up the information analyzed to generate a score. The summary views may be organized based on analyze factors, and include details on product maturity, sufficiency of testing, exploratory data reliability, and/or structured data reliability. In some embodiments, the summary views can be organized based on a relative contribution to the score and/or a relative degree of potential improvement to the score. In still other embodiments, the system can be configured to access some reviews and/or detailed views of underlying test information using the navigation options displayed on the left side of the screen. The system may also provide the option of accessing quality score and/or confidence level information within each of the displays accessed using the navigation options on the left side of the screen.

Figure 11:
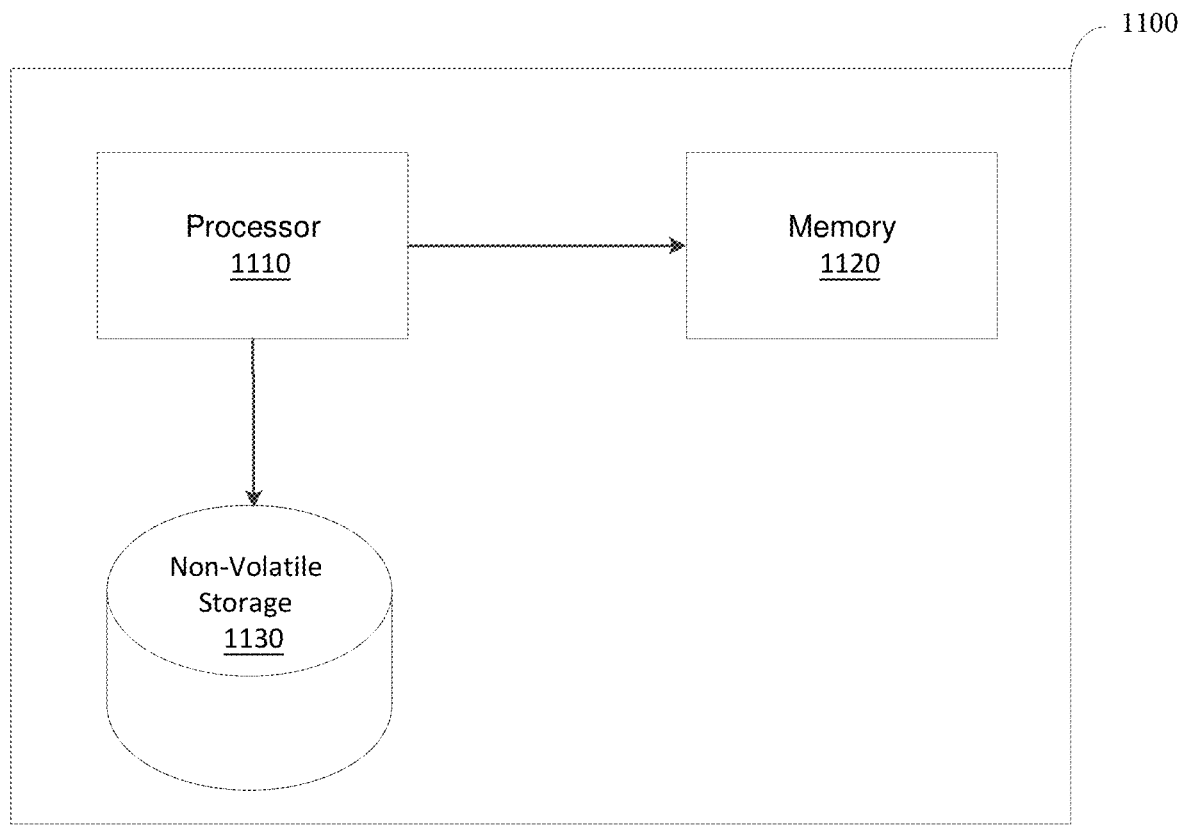
FIG. 11 is a block diagram of an example distributed system which can be improved according to the functions described herein, according to some embodiments.

An illustrative implementation of a computer system 1100 that may be used in connection with any of the embodiments of the disclosure provided herein is shown in FIG. 11. The computer system 1100 may include one or more processors 1110 and one or more articles of manufacture that comprise non-transitory computer-readable storage media (e.g., memory 1120 and one or more non-volatile storage media 1130). The processor 1110 may control writing data to and reading data from the memory 1120 and the non-volatile storage device 1130 in any suitable manner. To perform any of the functionality described herein, the processor 1110 may execute one or more processor-executable instructions stored in one or more non-transitory computer-readable storage media (e.g., the memory 1120), which may serve as non-transitory computer-readable storage media storing processor-executable instructions for execution by the processor 1110.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

The invention claimed is:

1. An assessment system comprising:
at least one processor operatively connected to a memory, the at least one processor configured to:
calculate a software quality score for a release candidate based on a set of user defined criteria for defining functionality of the release candidate to be tested, the software quality score defining a comprehensiveness of the testing of the release candidate and the comprehensiveness establishing how well a set of tests, when executed, evaluate the functionality defined by the user defined criteria;
calculate a confidence level associated with the software quality score, the confidence level calculated based on one or more dimensions associated with testing the release candidate, the confidence level being indicative of an accuracy of the calculated software quality score based on the one or more dimensions associated with testing the release candidate;
generate a user interface configured to display the software quality score and the confidence level associated with the software quality score;
generate a selectable visual indicator in the user interface and enable operation of the selectable visual indicator responsive to determining that the software quality score meets a predetermined threshold, wherein the selectable visual indicator is configured to: trigger integration of a software build into a software product or trigger release of the software build as a stand alone software product, responsive to selection of the selectable visual indicator in the user interface;
analyze the user defined criteria associated with at least the software quality score or the confidence level, wherein the user defined criteria comprise at least acceptable threshold values associated with testing the release candidate, including at least a minimum value associated with how comprehensively a testing platform evaluates functionality in the release candidate;
determine whether at least a portion of the user defined criteria has not been met;
if said at least a portion of the user defined criteria has not been met based at least in part on a comprehensiveness threshold, disable functionality of the selectable visual indicator;
display a learn more visual indicator;
upon interaction with the learn more visual indicator,
determine summary information for one or more tests that have been conducted;
determine one or more facets effecting the at least acceptable threshold values of the user defined criteria that has not been met by determining a deviation between contribution values associated with the one or more facets contributing to the software quality score and potential contribution values associated with the one or more facets if changes are made to the testing platform, wherein said facets comprise at least a test coverage score, and determine one or more corresponding recommendations for improving the one or more facets so that the at least acceptable threshold values of the user defined criteria will be met, wherein the one or more corresponding recommendations include at least one recommendation for conducting one or more additional tests for improving the test coverage score;
determine projected scores based on the set of user defined criteria used to calculate the software quality score, the projected scores being predictive software quality scores scoring effects on the set of user defined criteria based on if the one or more corresponding recommendations were to be followed, the projected scores compare-able to the software quality score based on the set of user defined criteria and determined prior to the one or more corresponding recommendations being followed;
display the one or more corresponding recommendations, the summary information for the one or more tests that have been conducted, and the projected scores for the user defined criteria if the one or more corresponding recommendations were to be followed;
receive an instruction to perform at least one of the one or more corresponding recommendations when the projected scores meet the at least one acceptable threshold value; and
re-enable the functionality of the selectable visual indicator when said one or more recommendations are satisfied.

2. The system of claim 1, wherein the at least one processor is configured to:
access test information associated with the release candidate;
generate a value associated with a plurality of bugs identified during testing and a severity associated with the respective ones of the plurality of bugs.

3. The system of claim 2, wherein the at least one processor is configured to:
adjust the value based on a status associated with respective ones of the plurality of bugs, wherein the status includes fixed and verified fixed, and the adjustment is greater for improving the software quality score for the verified fixed status relative to the adjustment for the fixed status.

4. The system of claim 1, wherein the at least one processor is configured to:
access test information associated with the software build;
generate a value associated with a plurality of bugs identified during testing and a priority associated with respective ones of the plurality of bugs.

5. The system of claim 1, wherein the at least one processor is configured to:
access test information associated with the software build;

generate a value associated with a plurality of bugs identified during testing and a bug value associated with respective ones of the plurality of bugs.

6. The system of claim 1, wherein the at least one processor is configured to:
aggregate at least one sub-score for values associated with at least one of a build severity score, build value score, or build priority score; and
adjust the at least one sub-score based on a volume of testing conducted on the software build.

7. The system of claim 6, wherein the at least one processor is configured to:
determine an absolute number of bugs relative to user defined threshold for an acceptable number of bugs; and wherein the at least one processor is configured to adjust the at least one sub-score based on the volume of testing conducted on the software build reflected in the absolute number of bugs.

8. The system of claim 6, wherein the at least one processor is configured to:
determine a relative number of bugs based on historical information on a number of bugs identified per software build; and wherein the at least one processor is configured to adjust the at least one sub-score based on the volume of testing conducted on the software build reflected in the relative number of bugs.

9. The system of claim 6, wherein the at least one processor is configured to:
determine an average value for testing duration based on analysis of prior test execution or a user tunable default threshold; and
wherein the at least one processor is configured to adjust the at least one sub-score based on the volume of testing conducted on the software build reflected in a difference between actual testing duration and the average value for testing duration.

10. The system of claim 1, wherein the user defined criteria comprises at least one threshold for a test execution percentage and said at least one recommendation comprises at least one request to execute at least one additional test to increase the software quality score.

11. The system of claim 10, wherein the at least one processor is configured to:
display an override option in the user interface, wherein responsive to activating the override option in the user interface, the at least one processor is configured to re-enable the functionality of the selectable visual indicator.

12. The system of claim 1, wherein the release candidate includes at least one of the software build, the software build comprising at least one of updated or new functionality to incorporate into, or operate as a standalone, software product, internet connected devices, hardware components with integrated functionality capable of testing in an electronic environment, or hybrid software and hardware devices.

13. A computer implemented method for assessing a release candidate, the method comprising:
calculating, by at least one processor, a software quality score for a release candidate based on a set of user defined criteria for defining functionality of the release candidate to be tested, the software quality score defining a comprehensiveness of the testing of the release candidate and the comprehensiveness establishing how well a set of tests, when executed, evaluate the user defined criteria;
calculating, by the least one processor, a confidence level associated with the software quality score, the confidence level calculated based on one or more dimensions associated with testing the release candidate, the confidence level being indicative of an accuracy of the calculated software quality score based on the one or more dimensions associated with testing the release candidate;
generating, by the least one processor, a user interface configured to display the software quality score and the confidence level associated with the software quality score;
generating, by the least one processor, a selectable visual indicator in the user interface;
analyzing the user defined criteria associated with at least the software quality score or the confidence level, wherein the user defined criteria comprise at least acceptable threshold values associated with testing the release candidate, including at least a minimum value associated with how comprehensively a testing platform evaluates functionality in the release candidate;
determining whether at least a portion of the user defined criteria has not been met based at least in part on a comprehensiveness threshold;
if said at least a portion of the user defined criteria has not been met, disabling functionality of the selectable visual indicator;
displaying a learn more visual indicator;
upon interaction with the learn more visual indicator,
determining summary information for one or more tests that have been conducted;
determining one or more facets effecting the at least acceptable threshold values of the user defined criteria that has not been met by determining a deviation between contribution values associated with the one or more facets contributing to the software quality score and potential contribution values associated with the one or more facets if changes are made to the testing platform, wherein said facets comprise at least a test coverage score, and determining one or more corresponding recommendations for improving the one or more facets so that the at least acceptable threshold values of the user defined criteria will be met, wherein the one or more corresponding recommendations include at least one recommendation for conducting one or more additional tests for improving the test coverage score;
determining projected scores based on the set of user defined criteria used to calculate the software quality score, the projected scores being predictive the software quality scores scoring effects on the set of user defined criteria based on if t one or more corresponding recommendations were to be followed, the projected scores compare-able to the software quality score based on the set of user defined criteria and determined prior to t one or more corresponding recommendations being followed;
displaying the one or more corresponding recommendations, the summary information for the one or more tests that have been conducted, and the projected scores for the user defined criteria if t one or more corresponding recommendations were to be followed; and
re-enabling the functionality of the selectable visual indicator when the one or more recommendations are satisfied; and
responsive to selection of the selectable visual indicator that has not been disabled in the user interface, triggering integration of the release candidate into a software product or triggering release of the release candidate as a stand-alone software product.

14. The method of claim 13, wherein the method further comprises:
accessing, by the at least one processor, test information associated with the release candidate; generating, by the at least one processor, a value associated with a plurality of bugs identified during testing and a severity associated with respective ones of the plurality of bugs.

15. The method of claim 14, wherein the method further comprises:
adjusting, by the at least one processor, the value based on a status associated with respective ones of the plurality of bugs, wherein the status includes fixed and verified fixed, and the adjustment is greater for improving the software quality score for the verified fixed status relative to the adjustment for the fixed status.

16. The method of claim 13, wherein the method further comprises:
access test information associated with a software build;
generate a value associated with a plurality of bugs identified during testing and a priority associated with respective ones of the plurality of bugs.

17. The method of claim 13, wherein the method further comprises:
accessing, by the at least one processor, test information associated with a software build; and
generating, by the at least one processor, a value associated with a plurality of bugs identified during testing and a bug value associated with respective ones of the plurality of bugs.

18. The method of claim 13, wherein the method further comprises:
aggregating, by the at least one processor, at least one sub-score for values associated with at least one of a build severity score, build value score, or build priority score; and
adjusting, by the at least one processor, the at least one sub-score based on a volume of testing conducted on a software build.

19. The method of claim 18, wherein the method further comprises:
determining, by the at least one processor, an absolute number of bugs relative to user defined threshold for an acceptable number of bugs; and
adjusting, by the at least one processor, the at least one sub-score based on the volume of testing conducted on the software build reflected in the absolute number of bugs.

20. The method of claim 18, wherein the method further comprises
determining, by the at least one processor, a relative number of bugs based on historical information on a number of bugs identified per software build; and
adjusting, by the at least one processor, the at least one sub-score based on the volume of testing conducted on the software build reflected in the relative number of bugs.

21. The method of claim 18, wherein the method further comprises
determining, by the at least one processor, an average value for testing duration based on analysis of prior test execution or a user tunable default threshold; and
adjusting, by the at least one processor, the at least one sub-score based on the volume of testing conducted on the software build reflected in a difference between actual testing duration and the average value for testing duration.

22. The method of claim 13, wherein the user defined criteria comprises at least one threshold for a test execution percentage and said at least one recommendation comprises at least one request to execute at least one additional test to increase the software quality score.

23. The method of claim 22, wherein the method further comprises:
displaying, by the at least one processor, an override option in the user interface; and
responsive to activating the override option in the user interface, re-enabling the functionality of the selectable visual indicator.

24. The method of claim 13, wherein the release candidate includes at least one of a software build, the software build comprising at least one of updated or new functionality to incorporate into, or operate as a standalone, software product, internet connected devices, hardware components with integrated functionality capable of testing in an electronic environment, or hybrid software and hardware devices.

* * * * *